April 22, 1952 H. R. SUMMERHAYES, JR 2,594,091
PIEZOELECTRIC CRYSTAL FREQUENCY DISCRIMINATOR
Filed Jan. 28, 1949
Fig. 1.
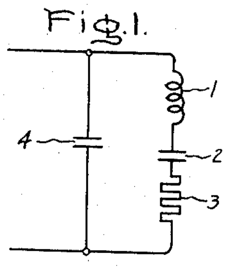
Fig. 2.
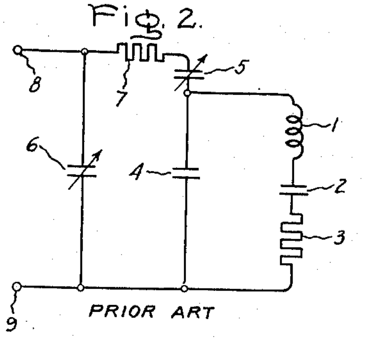
Fig. 5.
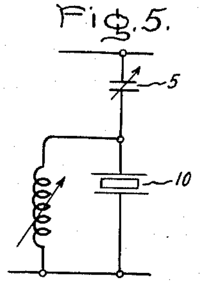
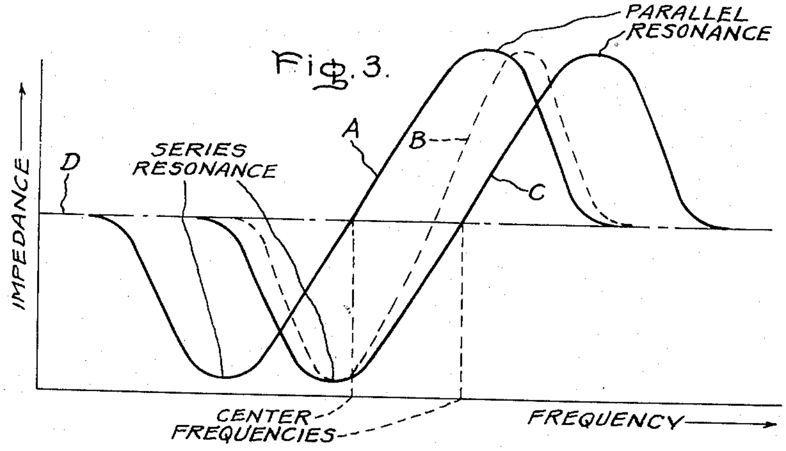
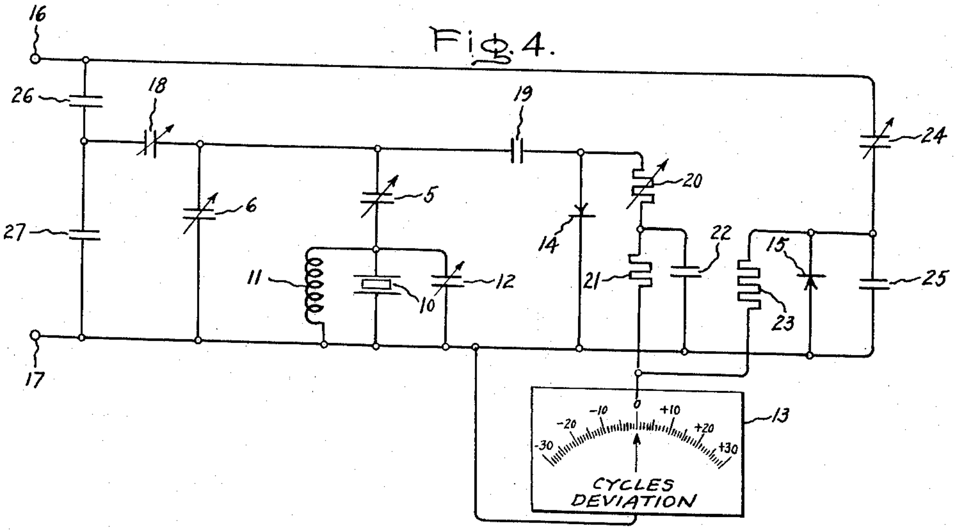
Inventor:
Harry R. Summerhayes, Jr.,
by Richard E. Hosley
His Attorney.

Patented Apr. 22, 1952

2,594,091

UNITED STATES PATENT OFFICE 2,594,091

PIEZOELECTRIC CRYSTAL FREQUENCY DISCRIMINATOR

Harry R. Summerhayes, Jr., Schenectady, N. Y., assignor to General Electric Company, a corporation of New York Application January 28, 1949, Serial No. 73,354

3 Claims. (Cl. 178—44)

My invention relates to frequency discriminators and more particularly to discriminators employing a piezoelectric crystal.

An object of the invention is to provide an improved crystal discriminator, and more particularly to provide a crystal discriminator which may be tuned through a range of frequencies without substantially altering the operating characteristics thereof.

Another object is to provide a crystal discriminator particularly adapted for use in radio frequency measuring devices, such as in monitors for radio transmitters.

A further object of the invention is to provide a crystal discriminator circuit comprising means for measuring departures of the received frequency from a predetermined frequency wherein the indication will be linear over a predetermined band of received frequencies and in which adjustments of the predetermined or center frequency may be accomplished without affecting the slope of the output current against input frequency characteristic of the linear portion which is used for frequency indication.

It has been suggested heretofore to utilize a crystal discriminator in the measurement or indication of departure of a received frequency from a predetermined center frequency. A system of this type is disclosed, for example, in United States Patent No. 2,343,633—Charles F. Baldwin, entitled "Frequency Measuring Device," issued and assigned to the assignee of the present invention. It is a general object of this invention to improve the system shown in this patent, particularly in providing means whereby adjustments of the frequency may be made without changing the slope of the characteristic curve.

The novel features which I believe to be characteristic of my invention are set forth with particularity in the appended claims. My invention itself, however, both as to its organization and method of operation, together with further objects and advantages thereof may best be understood by reference to the following description taken in connection with the accompanying drawing, in which Fig. 1 is a circuit diagram representing the equivalent circuit of a piezoelectric crystal; Fig. 2 is a diagram of a piezoelectric crystal frequency discriminator in accord with the prior art; Fig. 3 shows characteristic curves of crystal frequency discriminators; Fig. 4 is a diagram of a complete frequency monitor in accord with the invention; and Fig. 5 is a diagram of a modified portion of a frequency monitor in accord with the invention.

Piezoelectric quartz crystals at certain frequencies present the approximate equivalent of a series resonant circuit at a predetermined frequency corresponding approximately with the natural resonant frequency for the crystal. At the series resonant frequency, the effective impedance is a minimum.

Turning now to Fig. 1, the equivalent circuit of a crystal to a close approximation may comprise specifically an inductance 1, a capacitance 2 and a resistance 3 in series, shunted by a capacitance 4. The shunt capacitance includes the capacitance of the crystal holder as well as inherent circuit capacitance. The series resonant frequency is determined primarily by the values of capacitance 2 and inductance 1, being very little affected by shunt capacitance 4. The series resonance may be changed, however, by the addition of a capacitance in series with the crystal, and a capacitance for this purpose may be used in accord with my invention as later described.

At a frequency slightly higher than the series resonant frequency, the crystal presents a maximum impedance, since, at frequencies above series resonance, the portion of the circuit comprising inductance 1 and capacitance 2 becomes inductive, and at the frequency of maximum impedance, the shunt capacitance 4 forms a parallel resonant circuit with inductance 1 and capacitance 2 in series. A change in the value of shunt capacitance 4 has little effect on the frequency for series resonance but a substantial effect on the frequency for parallel resonance.

Fig. 2 shows the equivalent circuit of the crystal, and in addition, a series capacitor 5 and shunt capacitor 6, in the manner shown in the above patent No. 2 343,633. There is also shown a resistor 7, in series with capacitor 5, the purpose of which is to provide a desired amount of damping, thereby to improve the linearity of the characteristics curve between the series and parallel resonant frequencies. Series capacitor 5 is designed to have a many times greater value of capacitance than that of capacitance 2. Capacitance 2 is small, for example, of the order of .036 micromicrofarad, and the series resonance frequency can be varied through a narrow band of frequencies by varying capacitance 5.

As viewed between input terminals 8, 9 a series resonant, minimum impedance condition exists at a frequency determined by reactances 5, 2, 1 and 4. The frequency for series resonance is slightly higher than the series resonant frequency of capacitance 2 and inductance 1 alone and occurs at the frequency at which the resultant inductive reactance of reactances 1, 2 and 4 is equal to the capacitive reactance of capacitor 5, neglecting the effects of resistances 3 and 7. The series resonance frequency is established irrespective of the value of capacitor 6.

The parallel resonant frequency between terminals 8, 9, on the other hand, neglecting resistance 3, is determined by the values of both capacitors 5 and 6, and more specifically is that frequency at which parallel resonance exists between the effective capacitance of capacitors 5 and 6 in series, and the effective inductance of reactances 1, 2 and 4. It will be seen that the value of capacitor 5 affects both the series and parallel resonant frequencies, but it has been found that a variation or adjustment of the value of this capacitor does not equally affect these frequencies. Decreasing the capacitance of capacitor 5 will increase the frequency for parallel resonance less than the increase in series resonant frequency. It is believed that this result is obtained, simply stated, because the effective resultant capacitance change of capacitors 5 and 6 in series, which determines the change in parallel resonant frequency, is less than the effective capacitance change of capacitor 5 alone, which determines the change in series resonant frequency. A complete explanation of the result mentioned would be lengthy and complicated, and is not necessary to an understanding of the invention.

Referring to Fig. 3 of the drawings, the impedance of a crystal discriminator circuit as shown in Fig. 2 may be considered as curve A, having a minimum impedance at the series resonant frequency and a maximum at the higher parallel resonant frequency. The frequency for series resonance can be increased to that for dashed curve B by decreasing the value of capacitor 5, but this capacitance variation will have less effect on the parallel resonant frequency and the characteristics will take the form of curve B, of which the slope is less linear and steeper, between resonance points, than that of curve A. This variation of slope is undesirable. An increase in value of capacitor 5, would, of course, yield a characteristic to the left of curve A, of which the parallel resonance frequency point would be displaced from that of curve A less than the displacement of the series resonance frequency point.

In order to obtain, with decrease in capacitance of capacitor 5, a characteristic curve C for the crystal discriminator centered about a higher center frequency but with the same slope as the orginal curve A, it has been found practical and effective to shunt the crystal with an inductance, the reactance of which is equal, or substantially equal, throughout the band of frequencies between parallel and series resonance, to the reactance of the inherent shunt capacitance 4 of the crystal, the crystal holder and electrodes, and the distributed circuit capacitance.

The circuit of Fig. 4 comprises a frequency monitor operative in accord with the invention. The frequency monitor comprises a quartz crystal 10 with plated electrodes connected in series with an adjustable capacitor 5, another adjustable capacitor 6 being connected in shunt to the crystal and capacitor 5. It will be recognized that capacitors 5 and 6 serve substantially the same functions as the similarly arranged capacitors of Fig. 2, and that the equivalent circuit elements 1, 2, 3 and 4 representing the crystal in Fig. 2 are shown as a crystal 10 in Fig. 4.

In the frequency monitor of Fig. 4, and in similar applications of crystal discriminators, the change in center frequency which can be accomplished by adjustment of capacitor 5 is a desirable feature. Such adjustments may be required from time to time to compensate for changes in the center frequency due to aging of the circuit components or changes in operating temperature and the like. It is, however, undesirable to change the separation between the series and parallel resonance peaks and the slope or shape of the characteristic between the peaks.

In accord with the invention an inductance 11 is connected in shunt with the crystal and adjusted in effective reactance value to be numerically equal to the capacitive reactance of the effective shunt capacitance of the crystal, the crystal electrodes and crystal holder and the stray circuit capacitance, all as represented in Fig. 2 by capacitance 4. Adjustment of the effective inducitive reactance of inductance 11 is conveniently accomplished by connecting a variable capacitor 12 in parallel therewith.

It is to be noted that the effect of inductance 11 and capacitor 12 is to provide a net shunt inductive reactance, or impedance, for the crystal element 10 which is throughout the frequency range of the instrument substantially equal to the net effective shunt capacitive reactance, or impedance, of the crystal and of the conductors and circuit elements coupled thereto. The branch circuit including the crystal may be as shown in Fig. 4, wherein the net shunt inductance of element 11 is adjustable by varying the capacitor 12, or it may take the form shown in Fig. 5, wherein the effective shunt inductance is adjusted by varying directly the value of the inductance 11. Operation of the instrument of Fig. 4 will be substantially the same regardless of whether adjustment of the net inductive reactance is made by adding and substracting capacitance in shunt, as in Fig. 3, or by direct adjustment of the inductance itself, as in Fig. 4. It is usually found to be less expensive to provide a fixed inductance and variable capacitor rather than a variable inductance, and for this reason the circuit of Fig. 4 is usually to be preferred.

The monitor circuit of Fig. 4, in addition to the crystal discriminator circuits discussed above, including crystal 10, inductance 11, and capacitors 5, 6 and 12, comprises a meter 13 and rectifier 14 arranged to rectify and indicate the voltage across the crystal circuit. A biasing circuit for the meter is also provided which includes a rectifier 15. Input terminals 16, 17 of the monitor are arranged to receive a radio frequency signal to be monitored. The input signal is adjusted in intensity by variable capacitor 18 and applied across the crystal circuit, to provide a resulting voltage across the crystal circuit, the magnitude of which is determined by the impedance of the crystal circuit at the signal frequency. This voltage is applied through capacitor 19 to the rectifier meter circuit 13, 14. Resistors 20 and 21 are arranged in this circuit in series with the meter to form a high resistance voltmeter of the desired sensitivity, and bypass capacitor 22 is provided to filter alternating voltage components.

A direct current biasing voltage, determined in magnitude by the magnitude of the radio frequency input signal, is applied through isolating resistor 23 to the meter circuit, the proportion being adjustable by variation of the value of capacitor 24 through which the signal voltage is applied to rectifier 15. It will be recognized that variable capacitor 24 and fixed capacitor 25 form a voltage divider across the input terminals 16, 17. By properly proportioning capacitors 24 and 25, the direct current voltage supplied through resistor 23 to the meter 13 may be made just sufficient to provide zero meter current at the desired null or center frequency of the input signal. The desired center frequency, which may correspond to a central zero on the meter scale, should lie approximately midway between the series and parallel resonant frequencies for the crystal circuit, as indicated by the intersection of the horizontal dashed line D with the curve A or C as shown in Fig. 3. At the center frequency, the crystal circuit impedance is approximately midway between the maximum and minimum values. Deviations of the input signal frequency from the desired frequency provide proportional meter indications, of which the polarity corresponds to the direction of the deviation from the zero position of the meter, and such deviations may be indicated on a meter scale calibrated directly in cycles as shown.

Since the bias voltage is obtained from the input signal, a change in intensity of the signal does not change the meter reading at or near the zero or null point, where accuracy is of most importance, and for deviation frequencies, the accuracy of the meter reading is affected very little by such change in input signal intensity.

In a monitor of the type herein described it is not only desirable that the indicating meter be calibrated directly in cycles deviation from the desired frequency but in addition that the frequency responsive circuit should be adjustable from time to time to re-establish the exact desired center frequency and compensate for drifts therefrom due to aging of the crystal and circuit components or like causes. Both such direct calibration and adjustment are possible in the circuit shown since adjustments to the series resonant frequency by changing the value of capacitor 5 do not substantially affect the number of cycles separating the series and parallel resonant frequency points, nor change the slope or shape of the impedance curve from minimum to maximum. A frequency deviation of one cycle from the center frequency, accordingly, provides the same impedance change both before and after readjustment of capacitor 5 to recalibrate the center or null frequency.

The meter circuit performs an additional useful function in providing resistive damping for the crystal circuit. It will be understood that capacitor 19 is of low impedance at radio frequencies compared to the resistors comprising the meter circuit, and that the damping is almost purely resistive. The resistive impedance of the meter circuit is designed to be approximately equal to or slightly greater than the reactive impedance of capacitor 6. When this condition is approximately fulfilled, the slope of the impedance curve from the minimum to the maximum can be made substantially constant throughout a large portion of this range, the center frequency being at or near the center of this portion, and linear calibration in cycles of deviation on the meter is possible. The parallel or shunt damping of the meter circuit of Fig. 4 makes unnecessary, and performs substantially the same function as, the series damping resistor 7 of the circuit of Fig. 2.

Capacitors 26, 27 in Fig. 4 serve to isolate the monitor circuit from input terminal 16 and provide a voltage divider circuit which may be arranged to furnish the desired signal voltage intensity to the monitor discriminator circuit.

If it is desired to provide an instrument for operation in the broadcast frequency band from 550–1600 kilocycles, as for example, at or near 1000 kilocycles, and to indicate frequency deviations of plus or minus 30 cycles, an inductance 11 of approximately 0.001 henry and a variable capacitor 12 having a value of 3–36 micromicrofarads adjusted to about 15 micromicrofarads are suitable. The capacitor 6 may then have a value variable between 5 and 100 micromicrofarads, adjusted to about 60 micromicrofarads, and capacitor 5 may be adjustable between 35 and 75 micromicrofarads. The effective damping resistance of meter 13 and its associated circuits should be about 9200 ohms. Such values have been found to provide a frequency separation between the parallel and series resonance points of about 250 cycles. Adjusting capacitor 5 between 35 and 75 micromicrofarads will shift the center frequency by about 130 cycles. At lower frequencies below 1000 kilocycles, inductance 11 and capacitor 12 may be somewhat larger in value, capacitor 6 should be smaller in value, capacitor 5 may have a greater range of values and the damping resistance should be increased, in order to maintain similar operating characteristics and permit adjustments of the appropriate order of magnitude. For frequencies above 1000 kilocycles, the reverse will be the case in each instance.

The crystal 10 is desirably temperature controlled since drifts in the frequency thereof of only a few cycles are of major importance in an instrument of the type described which may be constructed to be responsive to signal deviations from the center or null frequency of only a fraction of one cycle.

While I have shown only certain preferred embodiments of my invention by way of illustration, many modifications will occur to those skilled in the art and I therefore wish to have it understood that I intend, in the appended claims, to cover all such modifications as fall within the true spirit and scope of my invention.

What I claim as new and desire to secure by Letters Patent of the United States is:

1. An adjustable frequency piezoelectric crystal discriminator comprising a piezoelectric crystal element connected in series with a variable capacitor to provide a series resonant circuit presenting an impedance minimum at a predetermined adjustable frequency, a second variable capacitor in shunt to said circuit determining an impedance maximum at an adjustable parallel resonant frequency of said circuit, and impedance means connected in parallel with said crystal element proportioned to provide a net inductive impedance shunting said crystal element substantially equal to the capacitive impedance represented by the effective shunt capacitance of said crystal element and the stray shunt capacitance of the conductors coupled thereto, said impedance means having a Q of a less order of magnitude than that of said crystal element, whereby adjustment of said series resonant frequency by said first variable capacitor adjusts said parallel resonant requency by substantially the same amount and in the same sense.

2. A piezoelectric crystal discriminator for operation in a predetermined limited frequency range comprising a crystal element connected, through electrodes therefor, in series with a variable capacitor, a second capacitor in shunt to said series circuit, said capacitor shunted series circuit having a frequency discriminating impedance characteristic varying from an impedance minimum determined by series resonance of said crystal with said variable capacitor to an impedance maximum determined by parallel resonance of said crystal with said second shunting capacitor, and inductive reactance means shunting said crystal arranged and proportioned to provide an inductive reactance across said crystal electrodes substantially equal throughout said range to the effective shunt capacitive reactance across said electrodes, said capacitive reactance including the equivalent circuit capacitive reactance of said crystal and the stray capacitive reactance between conductors connected to said crystal electrodes, thereby to permit adjustment of the location of said range through a small portion of the frequency spectrum by variation of said variable capacitor without substantial alteration of the frequency discrimination impedance characteristic of said discriminator.

3. In a frequency discriminator comprising a piezoelectric crystal, an adjustable capacitor in series with said crystal for providing minimum impedance at an adjustable series resonant frequency with said crystal and a second capacitor in parallel with said series connected capacitor and crystal for providing maximum impedance parallel resonance at a frequency removed from said series resonant frequency, an inductance in parallel with said crystal proportioned to compensate the effective shunt capacitance represented by said crystal and the circuit portions associated therewith, thereby to maintain the frequency discriminating impedance characteristic of said discriminator through a limited range of variation of said adjustable capacitor.

HARRY R. SUMMERHAYES, Jr.

REFERENCES CITED

The following references are of record in the file of this patent:

UNITED STATES PATENTS

| Number | Name | Date |
|---|---|---|
| 1,968,617 | Osnos | July 31, 1934 |
| 2,264,764 | Koerner | Dec. 2, 1941 |
| 2,309,481 | Summerhayes, Jr. | Jan. 26, 1943 |
| 2,438,392 | Gerber | Mar. 23, 1948 |